(12) United States Patent
Modha et al.

(10) Patent No.: US 8,463,723 B2
(45) Date of Patent: Jun. 11, 2013

(54) ELECTRONIC SYNAPSE

(75) Inventors: Dharmendra S. Modha, San Jose, CA (US); Chandrasekhar Narayan, San Jose, CA (US); John C. Scott, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 681 days.

(21) Appl. No.: 12/395,693

(22) Filed: Mar. 1, 2009

(65) Prior Publication Data
US 2010/0223220 A1    Sep. 2, 2010

(51) Int. Cl.
  *G06F 15/18* (2006.01)
  *G06J 1/00* (2006.01)
  *G06N 3/00* (2006.01)

(52) U.S. Cl.
  USPC .......................................... 706/33

(58) Field of Classification Search
  USPC .......................................... 706/33
  See application file for complete search history.

(56) References Cited

U.S. PATENT DOCUMENTS

| | | | |
|---|---|---|---|
| 4,204,276 A | 5/1980 | Glock et al. | |
| 4,874,963 A * | 10/1989 | Alspector | 706/34 |
| 5,117,391 A | 5/1992 | Hwang et al. | |
| 5,248,899 A | 9/1993 | Haronian et al. | |
| 5,299,286 A | 3/1994 | Imondi et al. | |
| 5,386,497 A * | 1/1995 | Torrey | 706/35 |
| 6,825,644 B2 * | 11/2004 | Kernahan et al. | 323/283 |
| 6,895,278 B1 * | 5/2005 | Gordon | 607/40 |
| 7,151,029 B2 | 12/2006 | Bozano et al. | |
| 7,251,152 B2 | 7/2007 | Roehr | |
| 7,392,230 B2 | 6/2008 | Nugent | |
| 7,978,510 B2 | 7/2011 | Modha et al. | |
| 2005/0015351 A1 | 1/2005 | Nugent | |
| 2005/0237834 A1 * | 10/2005 | Bozano et al. | 365/203 |
| 2007/0022064 A1 * | 1/2007 | Nugent | 706/15 |
| 2008/0275832 A1 * | 11/2008 | McDaid et al. | 706/33 |

FOREIGN PATENT DOCUMENTS
JP    2183237    7/1990

OTHER PUBLICATIONS

Valentino Braitenberg, Almut Schuz; "Cortex: Statistics and Geometry of Neuronal Connectivity"; Springer, 1998, pp. 1-240.
Goronkin, H. et al., "High-Performance Emerging Solid-State Memory Technologies", The Materials Research Society (MRS) Bulletin, Nov. 2004, pp. 805-813, vol. 29, No. 11, www.mrs.org/publications/bulletin.
Fazio A., "Flash Memory Scaling", The Materials Research Society (MRS) Bulletin, Nov. 2004, pp. 814-817, vol. 29, No. 11, www.mrs.org/publications/bulletin.

(Continued)

*Primary Examiner* — Kakali Chaki
*Assistant Examiner* — Ababacar Seck
(74) *Attorney, Agent, or Firm* — Kenneth L. Sherman, Esq.; Michael Zarrabian, Esq.; Sherman & Zarrabian LLP

(57) ABSTRACT

An electronic synapse device is provided. One embodiment of the invention includes a metastable switching synaptic device. Changing conductance of the metastable switching synaptic device occurs by receiving opposite signed first and second voltage pulses at the metastable switching synaptic device where magnitude of the first voltage pulse and the second voltage pulse each are below a switching voltage magnitude threshold. A magnitude difference between the first voltage pulse and the second voltage pulse exceeds the switching voltage magnitude threshold by an amount, wherein the amount is a function of a relative timing between the first voltage pulse and the second voltage pulse.

21 Claims, 12 Drawing Sheets

OTHER PUBLICATIONS

Grynkewich, G. et al., "Nonvolatile Magnetoresistive Random-Access Memory Based on Magnetic Tunnel Junctions", The Materials Research Society (MRS) Bulletin, Nov. 2004, pp. 818-821, vol. 29, No. 11, www.mrs.org/publications/bulletin.

Arimoto, Y., et al., "Current Status of Ferroelectric Random-Access Memory",The Materials Research Society (MRS) Bulletin, Nov. 2004, pp. 823-828, vol. 29, No. 11, www.mrs.org/publications/bulletin.

Hudgens, S., et al., "Overview of Phase-Change Chalcogenide Nonvolatile Memory Technology", The Materials Research Society (MRS) Bulletin, Nov. 2004, pp. 829-832, vol. 29, No. 11, www.mrs.org/publications/bulletin.

Yang, Y., et al, "Organic Thin-Film Memory", The Materials Research Society (MRS) Bulletin, Nov. 2004, pp. 833-837, vol. 29, No. 11, www.mrs.org/publications/bulletin.

Kuhr, W.G. et al., "Molecular Memories Based on a CMOS Platform," The Materials Research Society (MRS) Bulletin, Nov. 2004, pp. 838-842, vol. 29, No. 11, www.mrs.org/publications/bulletin.

Silva, H., et al., "Nonvolatile Silicon Memory at the Nanoscale", The Materials Research Society (MRS) Bulletin, Nov. 2004, pp. 845-851, vol. 29, No. 11, www.mrs.org/publications/bulletin.

Abbott, L.F. et al., "Synaptic Computation," Nature, Oct. 14, 2004, pp. 796-803, vol. 431.

Abbott, L.F. et al., "Synaptic Depression and Cortical Gain Control," Science, Jan. 10, 1997, pp. 220-224, vol. 275.

Ananthanarayanan, R. et al., "Anatomy of a Cortical Simulator," presented at Supercomputing 2007, Nov. 2007, 12 pages.

Bozano, L.D. et al., "Mechanism for Bistability in Organic Memory Elements," Applied Physics Letters, Jan. 26, 2004, pp. 607-609, vol. 84, No. 4.

Bozano, L.D. et al., "Organic Materials and Thin-Film Structures for Cross-Point Memory Cells Based on Trapping in Metallic Nanoparticles," Advanced Functional Materials, Nov. 2005, pp. 1933-1939, vol. 15.

Chicca, E. et al, "A VLSI Recurrent Network of Integrate-and-Fire Neurons Connected by Plastic Synapses With Long-Term Memory," IEEE Transactions on Neural Networks, Sep. 2003, pp. 1297-1307, vol. 14, No. 5.

Gotshall, S. et al., "Stochastic Training of a Biologically Plausible Spino-neuromuscular System Model," Proceedings of the 9th annual conference on genetic and evolutionary computation, Jul. 2007, pp. 253-260.

Saldana-Pumarica, J. et al., "CMOS Encoder for Scale-Independent Pattern Recognition," Proceedings of the 20th annual conference on Integrated circuits and systems design, Sep. 2007, pp. 241-244.

Scott, J.C. et al., "Nonvolatile Memory Elements Based on Organic Materials," Advanced Materials, May 2007, pp. 1452-1463, vol. 19.

Song, S. et al., "Competitive Hebbian Learning Through Spike-Timing-Dependent Synaptic Plasticity," Nature Neuroscience, Sep. 2000, pp. 919-926, vol. 3, No. 9.

U.S. Non-Final Office Action for U.S. Appl. No. 12/395,695 mailed Oct. 6, 2010.

U.S. Notice of Allowance for U.S. Appl. No. 12/395,695 mailed Mar. 8, 2011.

* cited by examiner

ELECTRONIC SYNAPSE

GOVERNMENT RIGHTS

This invention was made with United States Government support under Agreement No. HR0011-09-C-0002 awarded by Defense Advanced Research Projects Agency (DARPA). The government has certain rights in the invention.

BACKGROUND

1. Field of the Invention

The present invention relates generally to electronic switching devices, and more specifically to electronic synapse devices.

2. Description of the Related Art

Modern electronics have evolved through a series of major hardware developments such as transistors, integrated circuits, memories, and microprocessors. This has led to ubiquitous programmable electronic machines. Owing both to limitations in hardware and architecture, such conventional electronic machines are approaching the limits of their utility in complex, real-world environments, which demand an intelligence that has not yet been captured in an algorithmic-computational paradigm. As compared to biological systems for example, such programmable electronic machines are less efficient by a factor of one million to one billion in complex, real-world environments.

BRIEF SUMMARY

An electronic synaptic device is provided. One implementation comprises a first electrode, a second electrode, and a composite medium disposed between and in contact with the first and second electrodes. The composite medium comprises a layer of discrete charge trapping particles so that an electrical resistance measured between the first and second electrodes is selectively variable. Switching the electronic synaptic device to a binary ON state occurs by applying opposite signed first and second voltage pulses to the electronic synaptic device where magnitude of the first voltage pulse and the second voltage pulse each are below a switching voltage magnitude threshold. A magnitude difference between the first voltage pulse and the second voltage pulse exceeds the switching voltage magnitude threshold by an amount, wherein the amount is a function of a relative timing between the first voltage pulse and the second voltage pulse.

Still another embodiment of the invention provides an electronic synaptic system. One implementation comprises a first electronic neuron device is configured to generate and apply a first voltage pulse having a first sign to an electronic synaptic device. A second electronic neuron device is configured to generate and apply a second voltage pulse having an opposite sign than the first sign to the electronic synaptic device. In one embodiment of the invention, the electronic synaptic device comprises a first electrode, a second electrode, and a composite medium disposed between and in contact with the first and second electrodes. The composite medium comprises a layer of discrete charge trapping particles so that an electrical resistance measured between the first and second electrodes is selectively variable. Switching the electronic synaptic device to a binary ON state occurs by applying the opposite signed first and second voltage pulses to the first and second electrodes where magnitude of the first voltage pulse and the second voltage pulse each are below a switching voltage magnitude threshold. A magnitude difference between the first voltage pulse and the second voltage pulse exceeds the switching voltage magnitude threshold by an amount, wherein the amount is a function of a relative timing between the first voltage pulse and the second voltage pulse.

Yet another embodiment of the invention provides a method. One implementation comprises receiving a first voltage pulse having a first sign by an electronic synaptic device and receiving a second voltage pulse having an opposite sign than the first sign by the electronic synaptic device. Switching the electronic synaptic device to a binary ON state or a binary OFF state is achieved by receiving the opposite signed first and second voltage pulses by the electronic synaptic device where magnitude of the first voltage pulse and the second voltage pulse each are below a switching voltage magnitude threshold. A magnitude difference between the first voltage pulse and the second voltage pulse exceeds the switching voltage magnitude threshold by an amount, wherein the amount is a function of on the relative timing between the first voltage pulse and the second voltage pulse.

One embodiment of the invention provides another method. One implementation comprises receiving a plurality of first voltage pulses each having a first sign by a plurality of electronic synaptic devices and receiving a plurality of second voltage pulses each having an opposite sign than the first sign by the plurality of electronic synaptic devices. Switching each of the plurality of synaptic devices to binary ON states or binary OFF states is achieved by receiving the opposite signed plurality of first and second voltage pulses by the plurality of electronic synaptic devices. Magnitude of the plurality of first voltage pulses and the plurality of second voltage pulses each are below a switching voltage magnitude threshold. A magnitude difference between the plurality of first voltage pulses and the plurality of second voltage pulses exceeds the switching voltage magnitude threshold by an amount, wherein the amount is a function of a relative timing between the plurality of first voltage pulses and the plurality of second voltage pulses.

Another embodiment of the invention provides an electronic synapse device. One embodiment of the invention includes a multi-stable switching synaptic device, exhibiting a plurality of metastable conductance states. Switching the electronic synaptic device to from one to another of the plurality of metastable conductance states occurs by receiving opposite signed first and second voltage pulses by the electronic synaptic device where magnitude of the first voltage pulse and the second voltage pulse each are below a switching voltage magnitude threshold. A magnitude difference between the first voltage pulse and the second voltage pulse exceeds the switching voltage magnitude threshold by an amount, wherein the amount is a function of a relative timing between the first voltage pulse and the second voltage pulse.

Other aspects and advantages of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

For a fuller understanding of the nature and advantages of the invention, as well as a preferred mode of use, reference should be made to the following detailed description read in conjunction with the accompanying drawings, in which.

DETAILED DESCRIPTION

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc. The description may disclose several preferred embodiments for electronic synapse devices and behavior control of such devices, as well as operation and/or component parts thereof. While the following description will be described in terms of electronic synapse devices for clarity and placing the invention in context, it should be kept in mind that the teachings herein may have broad application to all types of systems, devices and applications.

One embodiment of the invention provides an electronic synapse device. One implementation comprises a multi-stable switching synaptic device, exhibiting two or more conductance states. Switching the electronic synaptic device between a conductance states occurs by applying opposite signed first and second voltage pulses to the electronic synaptic device where magnitude of the first voltage pulse and the second voltage pulse each are below a switching voltage magnitude threshold. A magnitude difference between the first voltage pulse and the second voltage pulse exceeds the switching voltage magnitude threshold by an amount, wherein the amount is a function of a relative timing between the first voltage pulse and the second voltage pulse.

Another embodiment of the invention provides a synaptic device of the invention comprising a two-terminal sandwich structure, with a memory material disposed between top and bottom electrodes. A net voltage difference applied between the two electrodes effect a change in the conductance of the memory material. The invention includes descriptions of suitable pulse shapes applied by the pre-synaptic and post-synaptic neurons, such that the change depends on their relative timing.

Figure 1A:
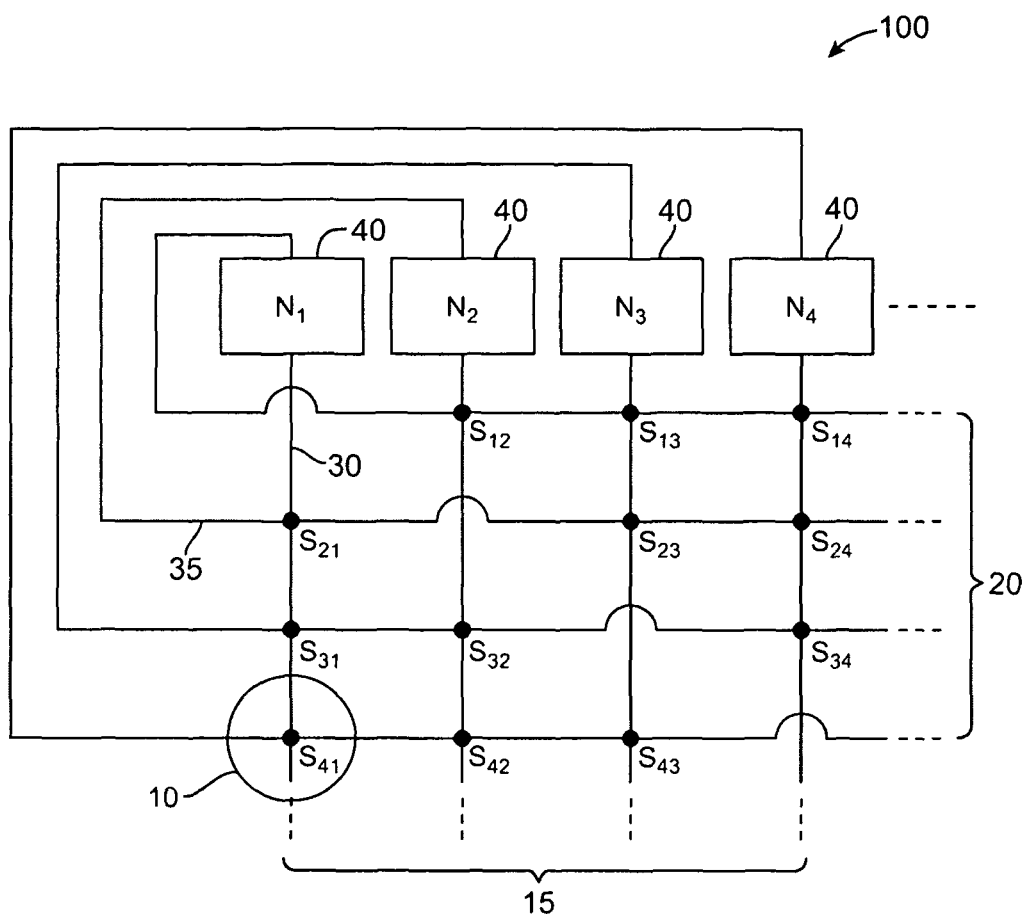
FIG. 1A illustrates a schematic of an exemplary operating environment in which a multi-stable synapse system of one embodiment of the invention may be used.
Figure 1B:
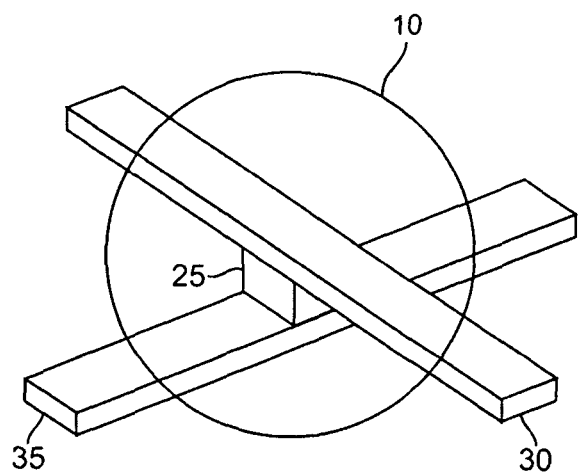
FIG. 1B illustrates an example multi-stable synapse device from the system shown in FIG. 1A.

FIG. 1A illustrates an exemplary high-level architecture of a memory array (or system) 100 comprising a plurality of bistable switching synaptic devices 10. FIG. 1B illustrates an example bistable synapse device 10. When used as a memory device, each bistable device 10 performs at one of two different electrical resistance values, an "ON" value or an "OFF" value, that can be externally set by applying a voltage pulse, greater in magnitude than a threshold voltage, to the bistable device 10. The "ON" value may, for example, represent a "1" bit while the "OFF" value may represents a "0" bit of data. The resistance of the bistable device 10 can be determined by applying a lower voltage (read voltage) to the bistable device 10. The read voltage does not affect the state of the bistable device 10. In the examples below a typical read voltage is less than about 1 volt, the turn-on voltage is about 2 to 4 volts and the turn-off voltage is greater than 5 volts. In a more general embodiment of the electronic synapse, the bistable synapse device 10 may be multi-stable exhibiting more than two distinct resistance states. In one embodiment of the invention the switching synaptic device 10 is a metastable switching synaptic device.

The crosspoint memory array 100 comprises an array of electrodes 15 and electrodes 20 that are disposed perpendicularly relative to each other. Electrodes 15 and electrodes 20 may also be disposed at any other relative angular orientations, such that electrodes 15, 20 intersect.

A multi-stable charge storage medium 25 is sandwiched between electrodes 15, 20. Consequently, each memory device, such as the multi-stable device 10, is positioned at the intersection of one column or line (the word line) and one row line (the bit line), and is connected to two neurons $N_i$ and $N_j$ 40, where i and j are positive integers. For example, the multi-stable device 10 (designated $S_{ij}$, where i and j are positive integers) comprises a segment of the ith axon-line electrode 30 connected to a column of multi-stable devices 10 and a segment of the jth dendrite-line electrode 35 connected to a row of multi-stable devices 10, where electrodes 30 and 35 have opposite polarities. The synapse device 10 is addressed when overlapping voltage pulses are applied between electrode 30 and electrode 35.

Figure 2:
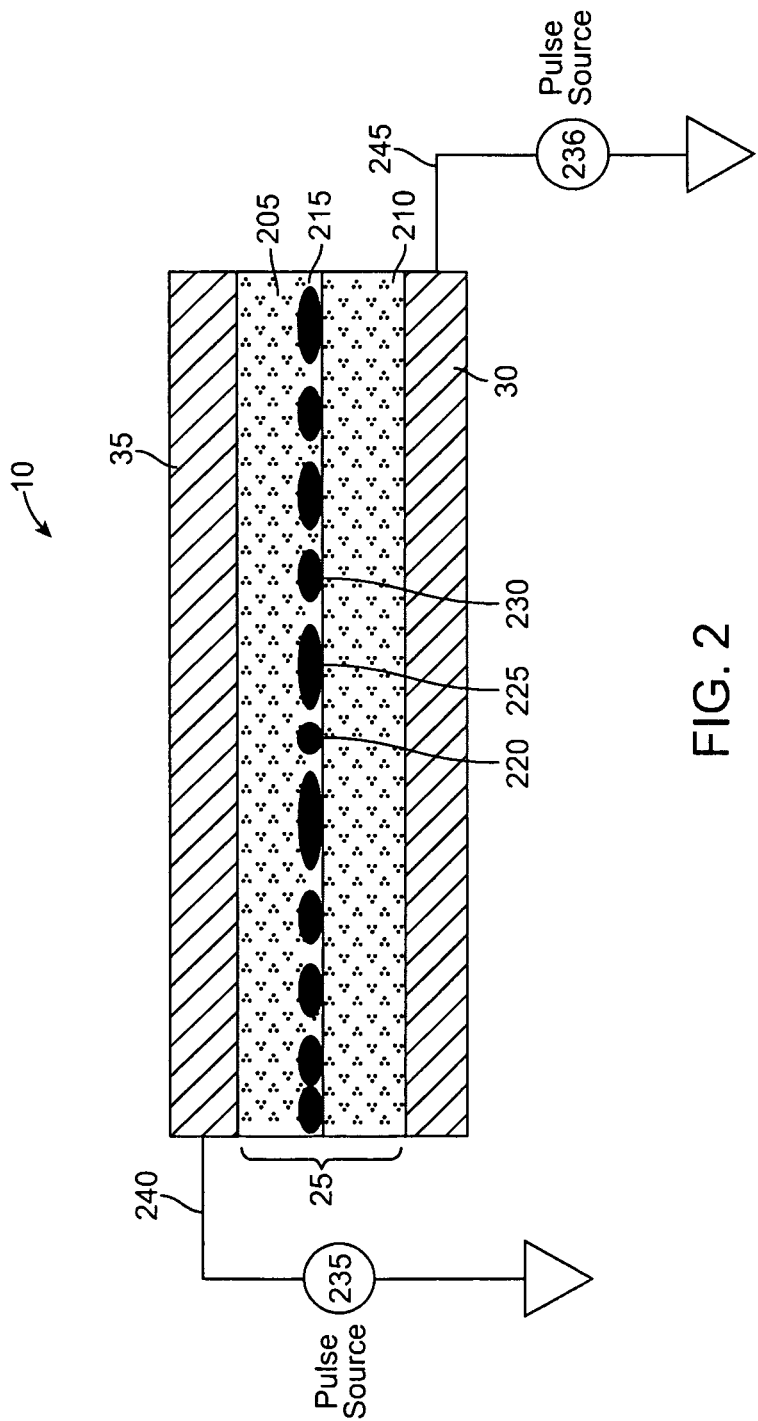
FIG. 2 illustrates a schematic of a cross-section view of the multi-stable synapse device of FIG. 1, shown utilizing a layer of discrete charge storage particles according to one embodiment of the invention.

An example structure for a multi-stable device 10 is illustrated by the diagram of FIG. 2. The multi-stable device 10 comprises the storage medium 25 that is disposed between an electrode 30 and an electrode 35. The storage medium 25 has a composite structure comprising a first layer 210, a second layer 205, and a charge trapping layer 215.

Layers 205, 210 comprise semi-conductive material. The charge trapping layer 215 comprises discrete charge storage particles, such as particles 220, 225, and 230. The discrete charge storage particles 220, 225, 230 do not interconnect with each other to form conductive paths, and are embedded at an interface between layers 205, 210. This composite structure of the storage medium 25 is placed between the electrode 30 and the electrode 35 and connected to a voltage pulse sources or sense circuitry 235 and 236 (e.g., neurons 40) by conductive leads 240, 245, where conductive lead 245 is coupled to electrode 30 and conductive lead 240 is coupled to electrode 35.

Figure 3:
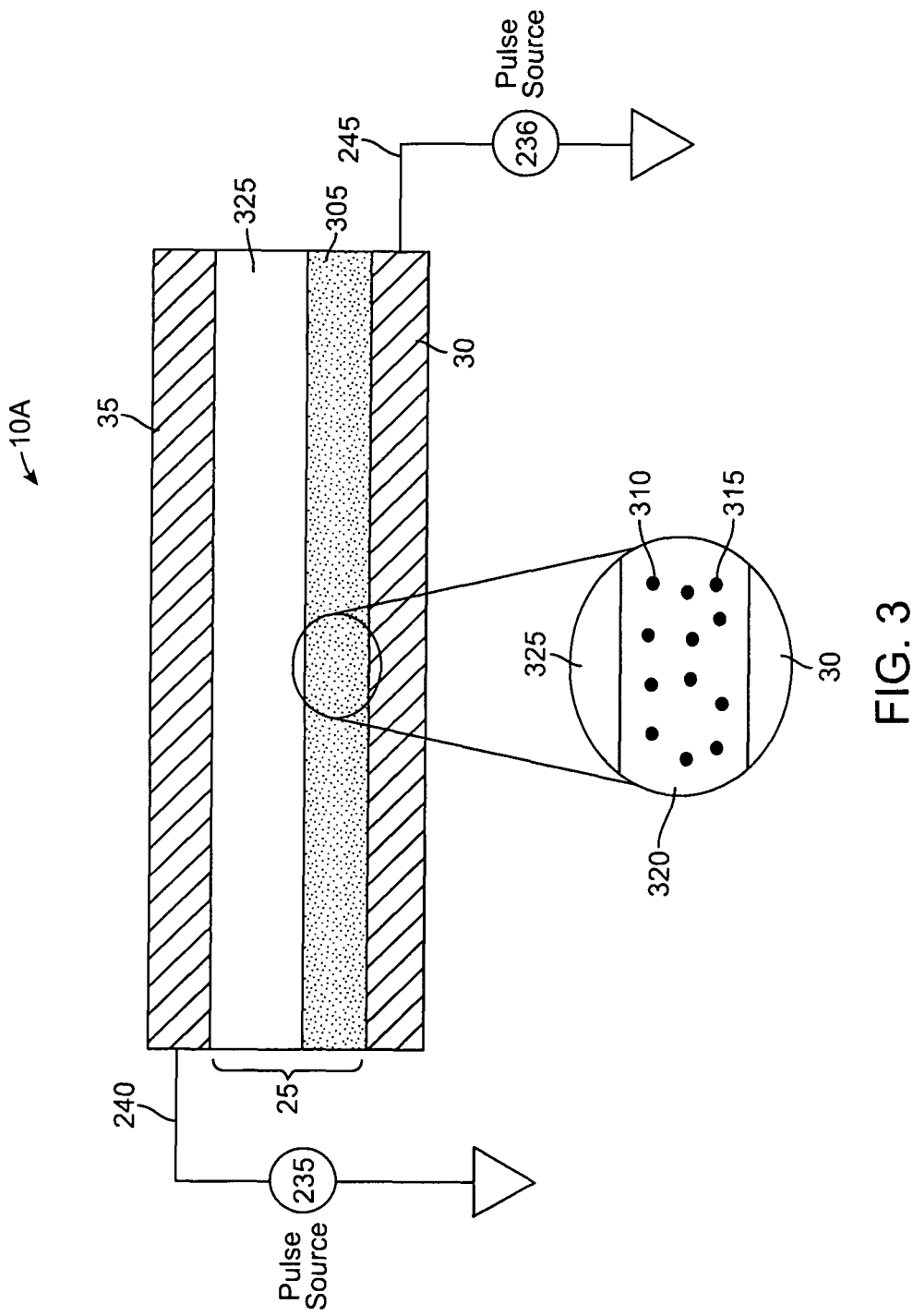
FIG. 3 illustrates a schematic diagram of an alternate embodiment of the invention of the multi-stable synapse device of FIG. 1 utilizing a semi-conductive layer with dispersed discrete charge storage particles.

In an alternative embodiment, a multi-stable device 10A is illustrated by the diagram of FIG. 3. The multi-stable device 10A comprises a storage medium 25 including an upper semiconductor layer 325, and a lower dispersed layer 305 that comprises a dispersion of discrete charge storage particles 310, 315, 320, embedded in a semiconducting host material. This composite structure of the storage medium 25 is placed between the electrode 30 and the electrode 35 and connected to a voltage pulse source or sense circuitry 235 and 236 (e.g., neurons 40) by conductive leads 240, 245, where conductive lead 245 is coupled to electrode 30 and conductive lead 240 is coupled to electrode 35.

Figure 4:
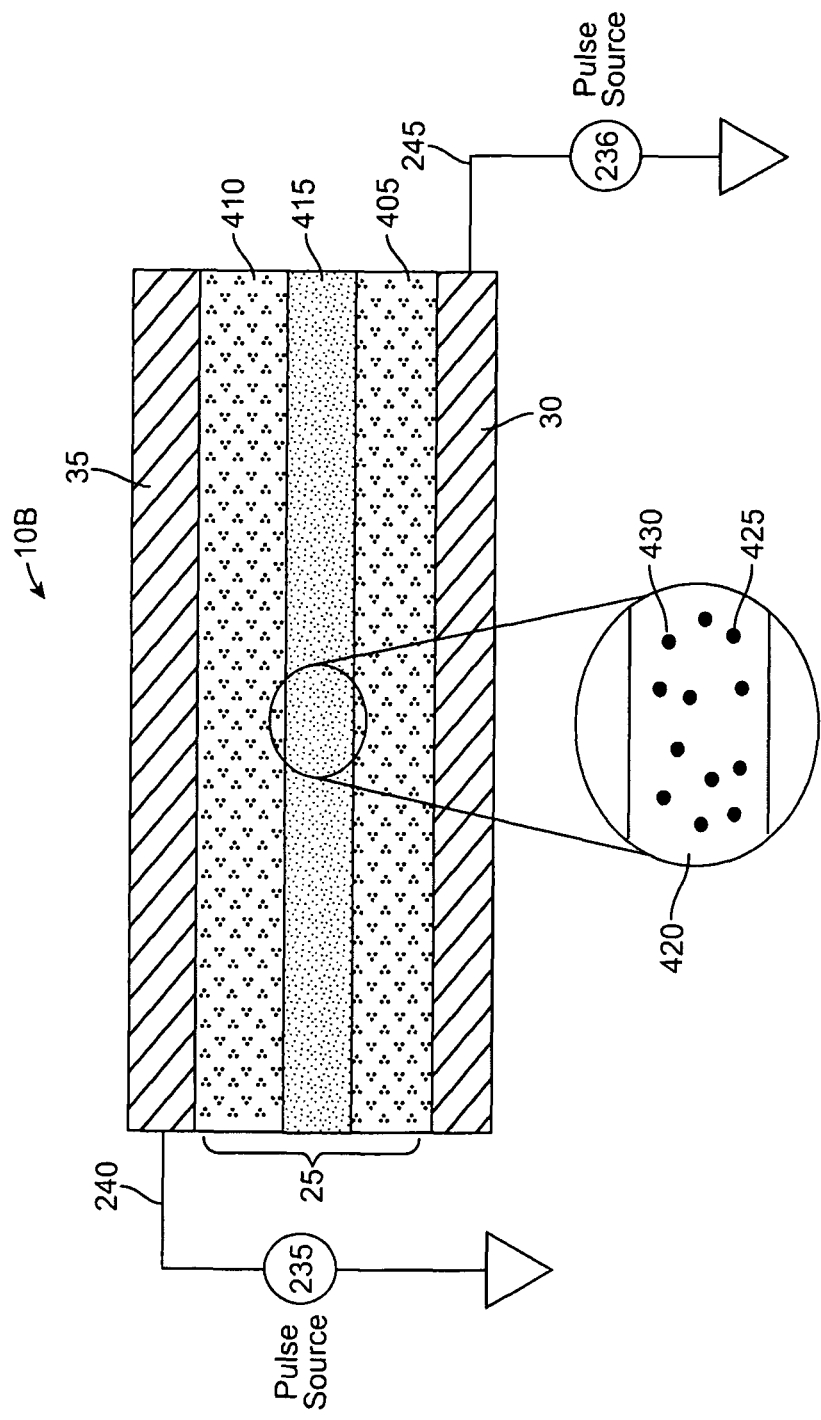
FIG. 4 illustrates a schematic diagram of a further alternate embodiment of the invention of the multi-stable memory device of FIG. 1 utilizing a semi-conductive layer with dispersed discrete charge storage particles.

In another embodiment, a multi-stable device 10B is depicted in FIG. 4. The multi-stable device 10B comprises a lower semiconductor layer 405, an upper semiconductor layer 410, and a dispersed layer 415. The dispersed layer 415 comprises a semiconductor that contains a dispersion of discrete charge storage particles 420, 425, 430. Layers 405 and 410 do not contain charge storage particles. As before, the multi-stable device 10B comprises electrode 30 and electrode 35, and the multi-stable device 10B is connected to the voltage pulse source or sense circuitry 235 and 236 by the conductive leads 240, 245, where conductive lead 245 is coupled to electrode 30 and conductive lead 240 is coupled to electrode 35. Layers 405, 410, and 415 may, in general, be of different thickness, and either or both of layers 405 and 410 may be omitted.

The behavior of the multi-stable device 10 (i.e., 10, 10A and 10B) can be determined by applying various voltage sequences to conductive leads 240 and 245 and measuring the resulting current as a function not only of the applied voltage but also of the voltage history. The device characteristics of the multi-stable device 10 may be described in terms of an exemplary current-voltage characteristic as illustrated in the graph 505 shown in FIG. 5 according to one embodiment of the invention.

The graph 505 is obtained by slowly sweeping the applied voltage downward from a maximum value. As shown, the characteristic of graph 505 is shaped like an "N" in that there is a local maximum in the current at a low applied voltage ($V_{MAX}$ 510), and a local minimum at a somewhat higher voltage ($V_{MIN}$ 515). Between the local maximum $V_{MAX}$ 510 and the minimum $V_{MIN}$ 515 is a region of negative differential resistance (NDR 520).

The bi-stable characteristic of the multi-stable device 10 may be demonstrated as follows. The multi-stable device 10 is turned "OFF" or set to represent a binary "0" (i.e., put into its high resistance state) by applying a voltage pulse of magnitude $V_{MIN}$ 515. The voltage pulse should return rapidly to zero voltage or near zero voltage after reaching the magnitude of $V_{MIN}$ 515.

An off-state resistance, $R_{off}$, of the multi-stable device 10 may then be determined by applying a voltage less than the threshold voltage $V_{th}$ 605 (preferably about half the value of $V_{th}$ 605) and measuring the corresponding current passing through the multi-state device 10. The multi-stable device 10 is turned "ON" or set to represent a "1" (i.e., put into its low resistance state) by applying a turn-on pulse of magnitude $V_{MAX}$ 510. The voltage pulse should return to zero voltage or near zero voltage after reaching the magnitude of $V_{MAX}$ 510.

The value of an on-state resistance, $R_{on}$, may be determined using an applied voltage of magnitude approximately half the value of $V_{th}$ 605. The resistance of the multi-stable device 10 in the high resistance "OFF" state, $R_{off}$, is at least ten times that of the "ON" state. Typically, the "OFF" state resistance $R_{off}$ may be several orders of magnitude higher that the "ON" state resistance $R_{on}$. Additionally, the stable states of the multi-stable device 10 may be set by applying a voltage pulse of magnitude between $V_{MAX}$ 510 and $V_{MIN}$ 515. The on-state resistance $R_{on}$ is expressed for unit area of the intersecting crosspoint point, and is less than 1 MegOhm·cm$^2$, and preferably less than 1 kiloOhm·cm$^2$.

Once the multi-stable device 10 is turned "OFF" or set to the high resistance, the turn-on behavior may be implemented by ramping the voltage between NDR 520 upward, as illustrated by graph 505. At some threshold voltage, such as $V_{th}$ 605, the multi-stable device 10 switches "ON," meaning that the current through the device rises rapidly to a value consistent with the on-state resistance. The current reaches a maximum value at $V_{MAX}$ 510. Intermediate values of the resistance of the multi-stable device 10 that are between the "ON" state resistance and the "OFF" state resistance may be obtained by "setting" the multi-stable device 10 at a voltage in the region NDR 520 and returning rapidly to zero.

When the multi-stable device 10 is turned "ON," any charges are stored on the discrete charge storage particles 220, 225, 230 (see FIG. 2) permit the flow of current among the other particles. As the voltage is increased in the "ON" state, charges (i.e., electrons) are injected from, for example, electrode 35 to electrode 30 (see FIGS. 2, 3 and 4) without initially charging or "populating" any discrete charge storage particles 220, 225, 230 beyond those that are already charged.

As the current increases and more charge enters the layer 205, it becomes increasingly probable that additional charges occupy the discrete charge storage particles 220, 225, 230. The charge that populates the discrete charge storage particles 220, 225, 230 are immobilized or trapped for a time that depends on the applied voltage, and upon the operating temperature.

The trapping properties of the discrete charge storage particles 220, 225, 230 may be tailored by the choice of substance, such as metal, used for the discrete charge storage particles 220, 225, 230, the size of the discrete charge storage particles 220, 225, 230, and their positions in the structure of the multi-stable device 10.

When sufficient charge has built up on the discrete charge storage particles 220, 225, 230, the resulting space-charge field from the charge trapping layer 215 reduces the injection of new charge at electrode 35. Consequently, the multi-stable device 10 enters the region NDR 520. At still higher voltages, at and above VMAX 510, the electric field at the discrete charge storage particles 220, 225, 230 is sufficient to start releasing the charge stored on the discrete charge storage particles 220, 225, 230, and the current through the multi-stable device 10 starts to flow more freely. Consequently, the optimum voltage for turning off the multi-stable device 10 is that voltage at which the maximum amount of charge is stored within the multi-stable device 10 (i.e., close to $V_{MIN}$ 515).

When the voltage applied to the multi-stable device 10 drops rapidly to a value below the threshold voltage $V_{th}$ 605, subsequent to the application of a turn-off pulse at $V_{MIN}$ 515, the trapped charge on the discrete charge storage particles 220, 225, 230 does not have time to leave the discrete charge storage particles 220, 225, 230. In addition, discrete charge storage particles 220, 225, 230 do not touch one another so that charge on the discrete charge storage particles 220, 225, 230 is not able to leak away from the area within the cross-point array 100 defined by the multi-stable device 10.

At a sufficiently low voltage, there is insufficient electric field to induce charge to leave the discrete charge storage particles 220, 225, 230. Consequently, the multi-stable device 10 can be set to a high resistance at $V_{MIN}$ 515, set to a low resistance at $V_{MAX}$ 510, set to an intermediate resistance by some voltage between $V_{MIN}$ 515 and $V_{MAX}$ 510, and read at a voltage lower than $V_{th}$ 605 (i.e., $V_{th}$ 605/2), regardless of the sequence of resistance settings. All control voltages are of the same voltage polarity.

In one embodiment of the invention, when sufficient charge has built up on the discrete charge storage particles 220, 225, 230, the resulting space-charge field from the charge trapping layer 215 reduces the injection of new charge at electrode 35. Consequently, the multi-stable device 10 enters the region NDR 520. At still higher voltages, at and above $V_{MIN}$ 515, the electric field at the discrete charge storage particles 220, 225, 230 is sufficient to start releasing the charge stored on the discrete charge storage particles 220, 225, 230, and the current in the multi-stable device 10 starts to flow more freely. Consequently, the optimum voltage for turning off the multi-stable device 10 is that voltage at which the maximum amount of charge is stored within the multi-stable device 10 (i.e., close to $V_{MIN}$ 515).

Exemplary materials that may be used in the construction of multi-stable device 10 are shown in TABLE 1 below.

TABLE 1

Exemplary materials that may be used in fabricating the multi-stable device 10 shown in FIG. 2, wherein $Alq_3$ is aluminum triquinolate, ITO is indium-tin-oxide, CuPc is copper phthalocyanine and NPB is N,N'-dinaphthyl-N,N'-diphenylbenzidine. All other symbols are standard representation of the elements, or alloys thereof.

| Example | Electrode 30 | Layer 210 | Charge Trapping Layer 215 | Layer 205 | Electrode 35 |
|---|---|---|---|---|---|
| 1. | Al | $Alq_3$ | Al | $Alq_3$ | Al |
| 2. | Al | $Alq_3$ | Cr | $Alq_3$ | Al |
| 3. | Al | $Alq_3$ | Mg | $Alq_3$ | Al |
| 4. | Al | $Alq_3$ | Ag | $Alq_3$ | Al |
| 5. | Al | NPB | Al | NPB | Al |
| 6. | Ni | $Alq_3$ | Al | $Alq_3$ | Al |
| 7. | Al | $Alq_3$ | Al | $Alq_3$ | Mg:Ag |
| 8. | Cr | $Alq_3$ | Al | $Alq_3$ | Al |
| 9. | ITO | $Alq_3$ | Al | $Alq_3$ | Al |
| 10. | Au | $Alq_3$ | Al | $Alq_3$ | Al |
| 11. | Cu | $Alq_3$ | Al | $Alq_3$ | Al |
| 12. | Al | $Alq_3$ | CuPc | $Alq_3$ | Al |
| 13. | Al | $Alq_3$ | CuPc/Al | $Alq_3$ | Al |
| 14. | Ag | SiO | Ag | SiO | Ag |
| 15. | Ag | SiO | Al | SiO | Al |
| 16. | Cu | SiO | Al | SiO | Al |
| 17. | Ag | SiO | Al | SiO | Au |
| 18. | Au | SiO | Al | SiO | Ag |
| 19. | Au | SiO | Ag | SiO | Ag |
| 20. | Ag | SiO | Al | SiO | Ag |
| 21. | Al | SiO | Al | SiO | Au |
| 22. | Ag | $Alq_3$ | Al | NPB | Al |
| 23. | Al | NPB | Cr | NPB | Al |
| 24. | Al | NPB | Mg | NPB | Al |

In a preferred embodiment of the invention, the multi-stable device 10 is used as a synapse 10 and is sensitive to the relative timing of the voltages applied to its two terminals, i.e., the axon-line electrode 30 and the dendrite-line electrode 35. In this embodiment of the invention, the electrical requirements for the multi-stable device 10 are nearly identical to those of a synapse 10 because a synapse 10 requires the following characteristics: the device is a two-terminal device; the device may include two or more resistance values, selected by an appropriate voltage pulse across the device; the device has long term retention of the set resistance, including immunity to low voltage probes of the state, i.e., a non-destructive memory read; the device has endurance to multiple ON-OFF cycles. In one embodiment of the invention, the synapse 10 may have very low power consumption, and pass very small currents unlike the electrical characteristics needed for a multi-stable device 10 when used as a memory device.

Figure 5:
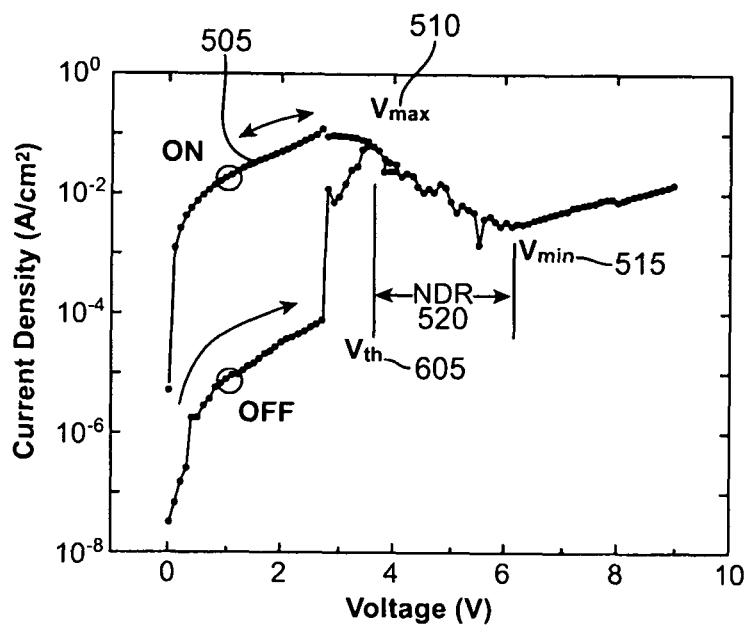
FIG. 5 illustrates an electrical response graph of a multi-stable synapse device according to an embodiment of the invention.
Figure 6:
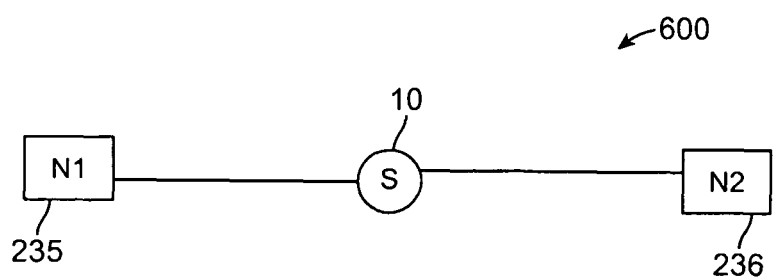
FIG. 6 illustrates a connection (S) between the pre-synaptic neuron (N1) and the post-synaptic neuron (N2) according to one embodiment of the invention.

FIG. 6 illustrates a multi-stable device 10 used as a synapse device 10 (S) between two neurons, a pre-synaptic neuron N1 235 and a post-synaptic neuron N2 236 according to one embodiment of the invention based on particular applied voltage pulses. As illustrated in FIG. 5, there is a regime of NDR 520 bounded by voltages $V_{MAX}$ 510 and $V_{MIN}$ 515. In one embodiment of the invention a voltage pulse near $V_{MAX}$ 510 sets the synapse device 10 to a low-resistance (ON) state (i.e., $V_{MAX}$ 510=$V_{ON}$). In this embodiment of the invention a voltage pulse near $V_{MIN}$ 515 sets the device off (i.e., $V_{MIN}$ 515=$V_{OFF}$). In one embodiment of the invention the fall-time of the $V_{OFF}$ pulse must be short enough (such as less than 1 ms.) that the device does not follow the trajectory through $V_{ON}$. The state of the synapse device 10 may be read by an application of a voltage pulse that does not exceed the switching threshold, $V_{th}$ 605. In this example embodiment of the invention, a reading voltage of 1 volt results in a current density>$10^{-2}$ A/cm$^2$ in the ON-state, and <$10^{-5}$ A/cm$^2$ in the OFF-state.

In one embodiment of the invention intermediate states between ON and OFF may be accessed by application of voltage pulses in the NDR regime. In this embodiment of the invention the state of the synapse device 10 is dictated by the last voltage level above the threshold ($V_{th}$ 605) that was applied across it. In one embodiment of the invention the synapse device 10 is known as a nanotrap device. In this embodiment of the invention the synapse device 10 is substantially symmetric, i.e. voltages of opposite polarity result in similar (but reversed) currents and switching behavior.

In one embodiment of the invention the specific requirements for the response of the synapse device 10 may be refined by the following. The net voltage across the synapse device 10 is the time dependent voltage difference $V_1(t)$–$V_2$ (t), where $V_1(t)$ is a pre-synaptic voltage pulse generated and applied from N1 235, and $V_2(t)$ is a post-synaptic voltage pulse generated and applied from N2 236. The polarity of the voltage which turns the device 10 on is defined to be positive, i.e. $V_{ON}$>0. The voltage pulse with a positive trailing edge is taken to be from N1 235, $V_{1T}$>0. In this embodiment of the invention, as $V_2$ is progressively delayed, the last opportunity to set the state corresponds to the "trailing edge" of $V_1$.

In one embodiment of the invention, the synapse device 10 may satisfy the following criteria: coincidence of the two pulses should switch the synapse device 10 to an ON state (i.e., low resistance). In this embodiment of the invention there is a delay time (defined as $t_d$=0) when the trailing edge of $V_1$ and the level of the $V_2$ pulse give:

$$V_{1T} - V_{2on} = V_{on} \quad \text{(eq. 1)}$$

Since $V_{ON}$>$V_{1T}$>0, it follows that $V_{2ON}$<0. In this embodiment, a positive delay ($t_d$>0, voltage pulse $V_2$ occurs after voltage pulse $V_1$) switches the synapse device 10 off. The last high voltage applied is the difference between the trailing edge of voltage pulse $V_1$ and the leading edge of voltage pulse $V_2$. Thus:

$$V_{1T} - V_{2L} = V_{OFF} \quad \text{(eq. 2)}$$

If $V_{OFF}$<0, $V_{2L}$=$V_{1T}$+|$V_{OFF}$|>|$V_{OFF}$|>0. Therefore, voltage pulse $V_2$ alone would switch device 10 off, contrary to the desired synaptic function. It follows then for one embodiment of the invention that $V_{off}$>0; also that $V_{2L}$<0.

In one embodiment of the invention between the leading and trailing edges, V1 and V2 may assume any value that does not exceed threshold $V_{th}$ 605, and may be adjusted to refine the nature of the response.

Figure 7C:
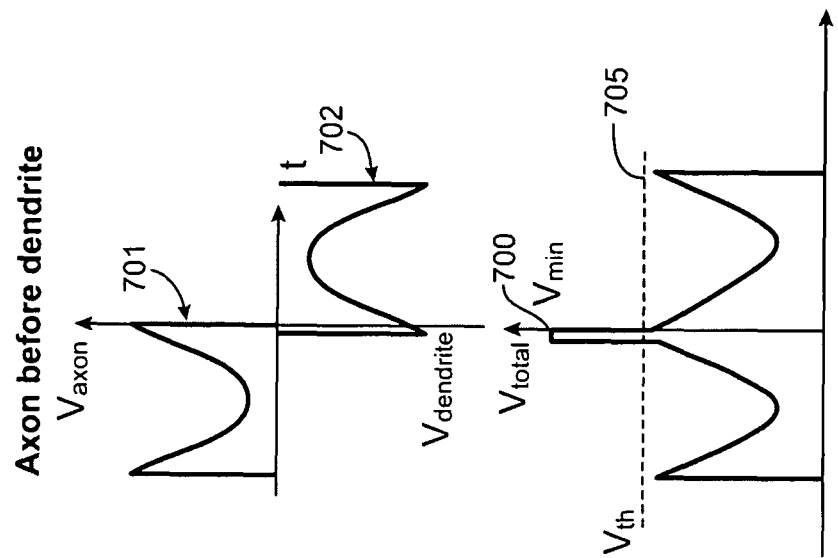
FIGS. 7A-C illustrate graphs showing the pulse-timing dependent total voltage across an electronic synapse for identical double-peaked voltage pulses of opposite sign according to one embodiment of the invention.
Figure 7B:
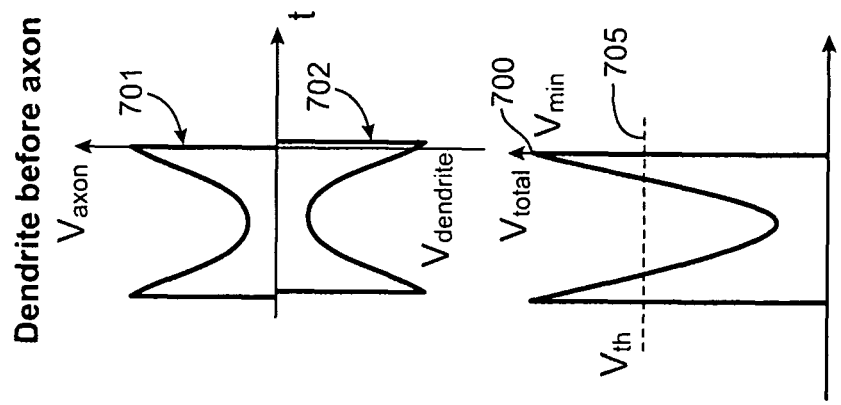
Figure 7A:
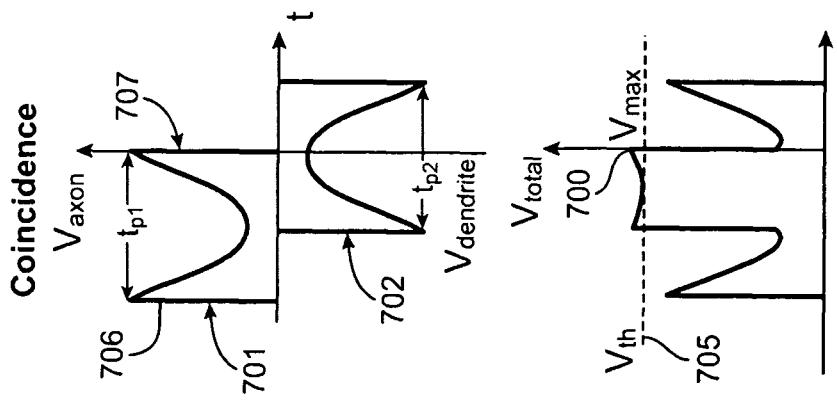

FIGS. 7A-C illustrate graphs showing example voltage pulses applied from N1 235 and N2 236 across the electrodes of the synapse device 10. In FIG. 7A the pre-synaptic voltage pulse 701 and post-synaptic voltage 702 are fired such that the trailing edge of the pre-synaptic voltage 701 coincides with the center of the symmetric post-synaptic voltage 702. The coincidence defines the zero of the delay time, $t_d$=0. In FIG. 7B the pre-synaptic voltage pulse 701 is fired after the post-synaptic voltage 702. In FIG. 7C the pre-synaptic voltage pulse 701 is fired before the post-synaptic voltage 702. In one embodiment of the invention the voltage pulses have a variety of delays between V1 (pre-synaptic voltage pulse) and V2 (post-synaptic voltage pulse) depending on the firing times of the pre-synaptic neuron 235 and post-synaptic neuron 236, which is unlike the pulses set with constant timing at $V_{MIN}$ 515 and $V_{MAX}$ 510 when the device 10 is used as a memory device instead of a synapse device 10. In this embodiment of the invention the voltage pulses vary in time from the pre-synaptic voltage pulse leading edge voltage magnitude V1L (e.g., V1L 706) to the pre-synaptic voltage pulse trailing edge voltage magnitude V1T (e.g., V1T 707) and from the post-synaptic voltage pulse leading edge voltage magnitude V2L to the post-synaptic voltage pulse trailing edge voltage magnitude V2T, but never exceed the leading or trailing edges in magnitude. Also, since V2 remains the negative of V1, the quiescent bias voltage V0=0, and may be the optimum choice to ensure that a threshold $V_{th}$ 705 is not exceeded. In this example, the voltage pulse duration tp1, tp2 are preferably about 100 ms (where tp1 is the time duration of the voltage pulse V1 and tp2 is the time duration of the voltage pulse V2). In one example, V1L=V1T=−V2T=−V2L=2.5V. The state of the synapse device 10 is dictated by the net voltage 700 at the trailing edge of V1 707 (the setting voltage, $V_{set}$). If the magnitude of the delay time is greater than voltage pulse duration (100 ms in this example), the pulses do not overlap and the net voltage is always below $V_{th}$ 705. The delay is not actively controlled as it arises directly from the relative firing times of the two neurons. If the firing of N1 caused or contributed to the firing of N2, then the firings are causally related and N2 fired soon after N1.

Figure 8:
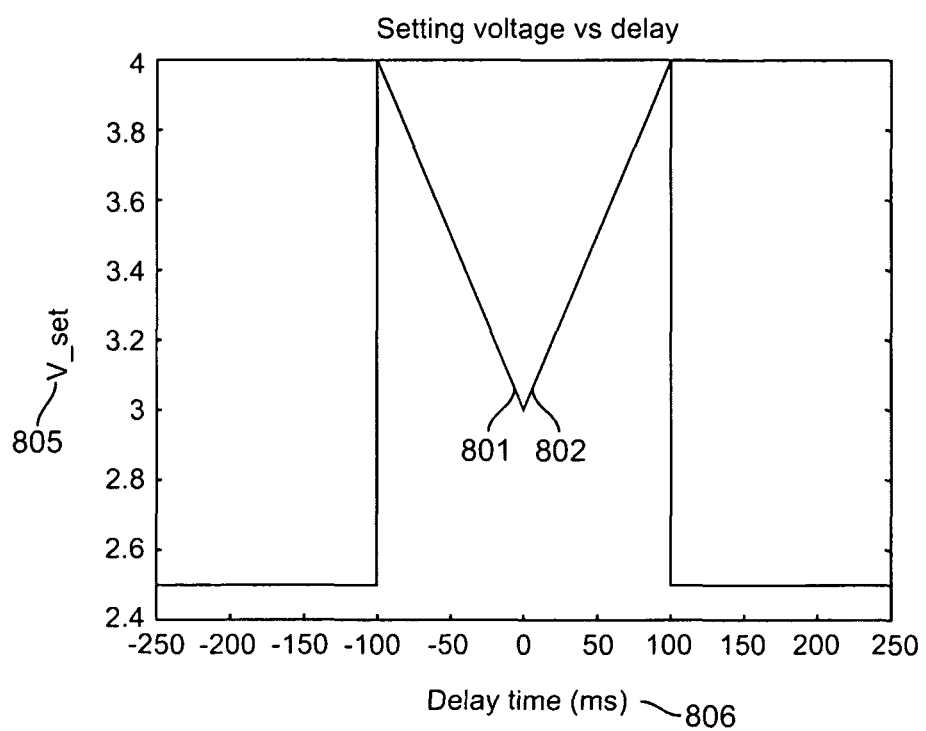
FIG. 8 illustrates a graph showing setting voltage as a function of delay time for first and second identical trapezoidal voltage pulses across an electronic synapse for voltage pulses of opposite sign according to one embodiment of the invention.

FIG. 8 illustrates a graph showing voltage set as a function of delay time for first and second identical trapezoidal voltage pulses across an electronic synapse for voltage pulses of opposite sign. A setting voltage 805 has an associated delay 806 wherein both voltage pulse V1 and voltage pulse V2 have a duration of 100 ms, according to one embodiment of the invention. In this embodiment of the invention, for zero delay, the net voltage is V1T−V2T=3V, which switches the synapse device 10 to its ON state. For delays up to +/−100 ms, the last voltage above the voltage switching threshold ramps (801, 802) to V1L−V2T=V2T−V1L=4V, which is well into the NDR region 520 (see FIG. 5) of the synapse device 10 and may set the resistance higher by a factor of 10.

Figure 9:
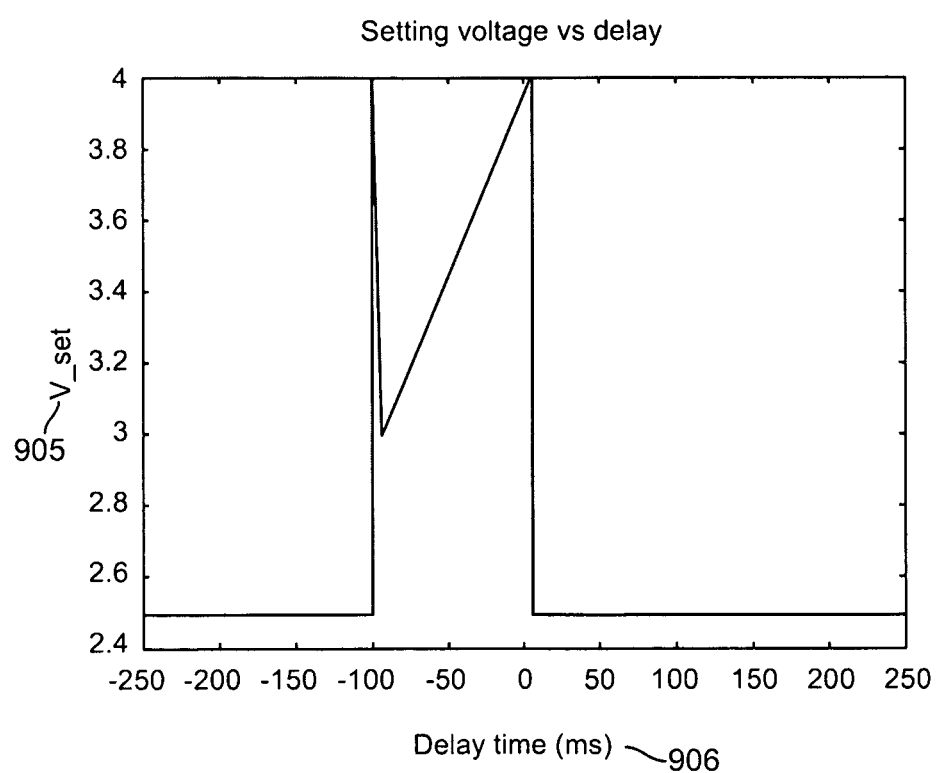
FIG. 9 illustrates a graph showing setting voltage versus delay time for first and second trapezoidal voltage pulses of unequal length across an electronic synapse for voltage pulses of opposite sign according to one embodiment of the invention.

FIG. 9 illustrates a graph showing voltage versus delay time for first and second trapezoidal voltage pulses of unequal length across an electronic synapse for voltage pulses of opposite sign. FIG. 9 shows the effect of voltage pulse duration where the duration of pulse V1(t) is reduced to 5 ms, according to one embodiment of the invention. As illustrated in FIG. 9, a setting voltage ($V_{set}$) 905 is graphed versus delay time 906. In this example, the voltage pulses V1 and V2 have different pulse duration. As illustrated, the duration of V1 (tp1) is 5 ms and the duration of V2 (tp2) is 100 ms. In this embodiment of the invention, a short lead time of the V2 voltage pulse over the V1 voltage pulse results in a switch to the OFF-state, but a positive delay results in the same setting voltage 802 as shown in FIG. 8.

Figure 10:
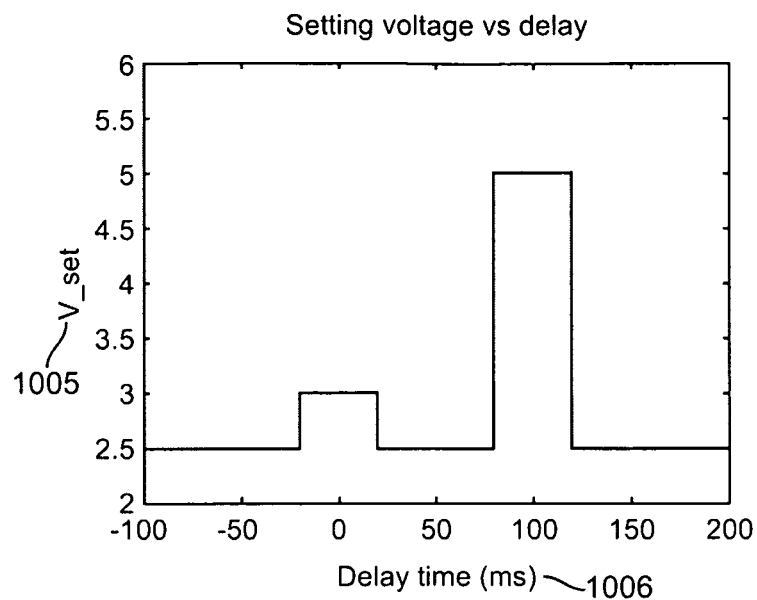
FIG. 10 illustrates a graph showing setting voltage that results from a first square voltage pulse across an electronic synapse that combines with two negative second voltage pulses according to one embodiment of the invention.

FIG. 10 illustrates a graph showing first square voltage pulse across an electronic synapse that combines with two negative pulses. The graph in FIG. 10 shows another example of an embodiment of the invention with setting voltage 1005 graphed versus delay time 1006 for a single square pulse V1 from N1 235 that combines with two negative voltage pulses V2 from N2 236 separated by 100 ms. In this embodiment of the invention, binary ON/OFF states may be established by a combination of the rectangular voltage pulse V1 and double rectangle pulse V2. In one example embodiment of the invention, V1=+2.5V for a time of 20 ms, and V2=−2.5V for 20 ms, followed by a second pulse V2 of −0.5 V occurring 100 ms later. A coincident arrival of voltage pulse V2 results in a net voltage of 3V which switches the synapse ON; if the voltage pulse V2 fires 100 ms late, the setting voltage is 5V and the result is a switch to the OFF-state.

Figure 11:
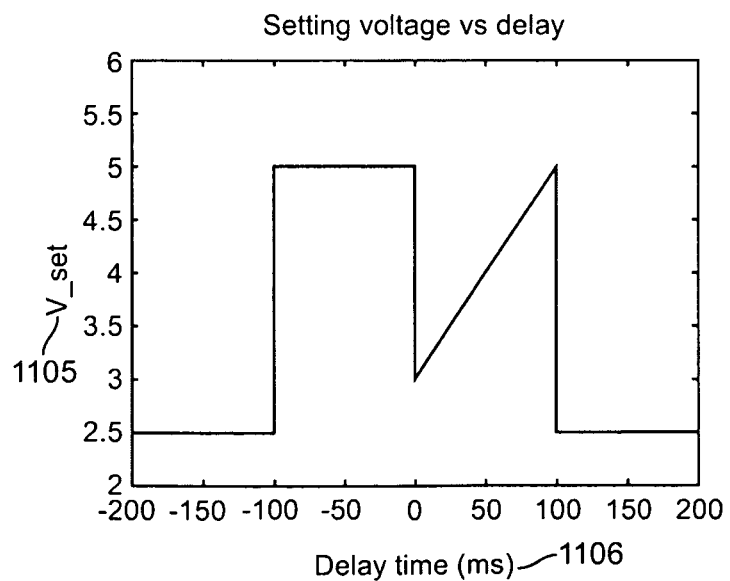
FIG. 11 illustrates a graph showing setting voltage that results from a combination of a first square voltage pulse and a second trapezoidal voltage pulse across an electronic synapse for voltage pulses of opposite sign according to one embodiment of the invention.

FIG. 11 illustrates a graph showing a combination of square and trapezoidal voltage pulses across an electronic synapse for voltage pulses of opposite sign. In this example graph for an embodiment of the invention, voltage setting 1105 is shown versus delay time 1106 for a square pulse V1 from N1 235, and a ramp pulse V2, followed by a constant level V2 from N2 236 can be used to provide the setting-voltage 1105 profile as illustrated. In this embodiment of the invention the net voltage switches the synapse device 10 off for arrival of a voltage pulse V2 between −100 ms and coincidence at time zero, at which point the synapse device 10 switches on. In this embodiment of the invention later arrival times result in progressively higher resistances. In certain embodiments of the invention if the pulses do not overlap, there is no change of the switching state (i.e., the current state remains). FIGS. 8-11 are provided as examples to show the flexibility in choosing pulse shapes in order to achieve a desired behavior of resistance vs. delay time.

Figure 12:
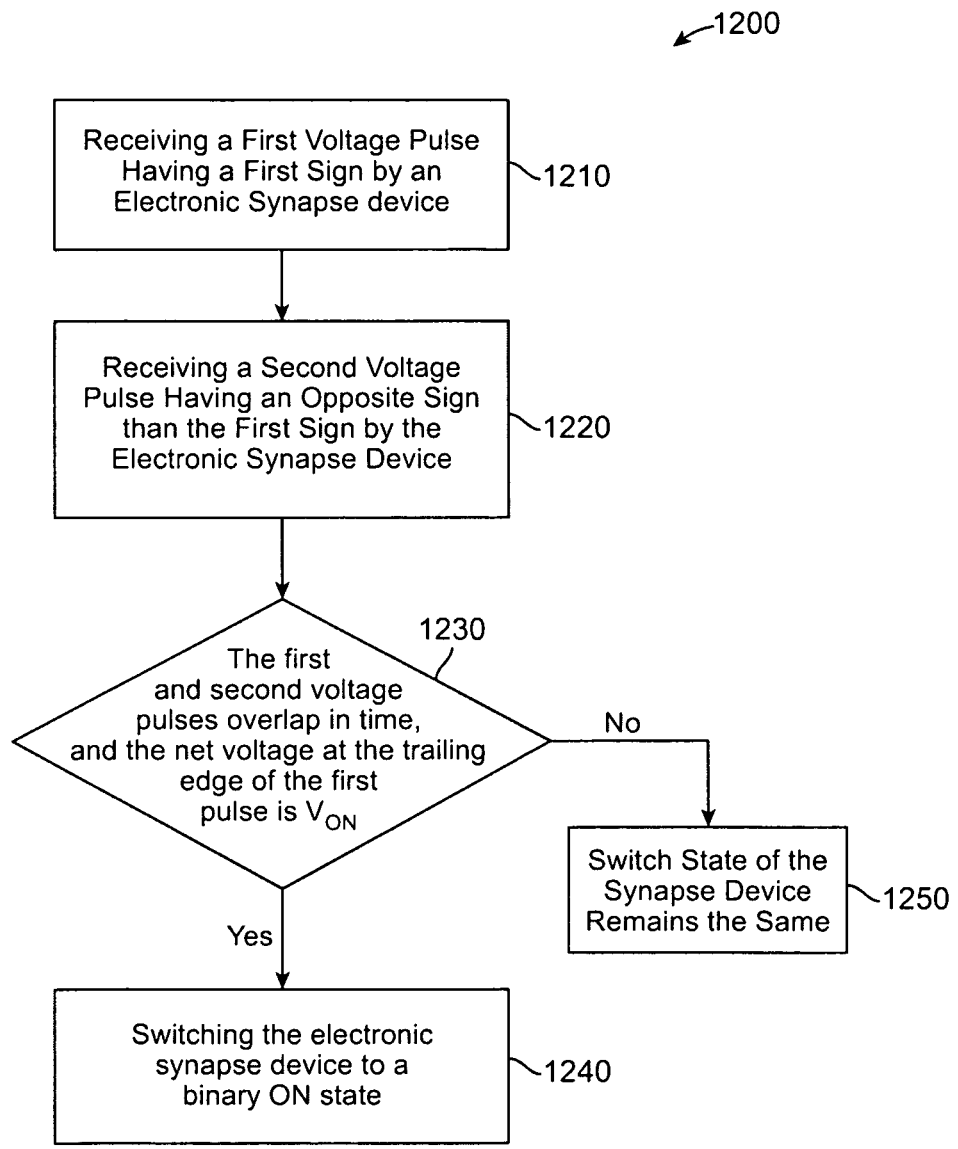
FIG. 12 illustrates a block diagram of a process for switching an electronic synapse to a binary ON state according to an embodiment of the invention.

FIG. 12 illustrates a block diagram of a process 1200 for switching a synapse device, such as synapse device 10, to a binary ON state based on a series of controlled/uncontrolled voltage pulses V1 and V2 as illustrated in FIGS. 7A-11. In block 1210, a first voltage pulse V1 is generated by an electronic neuron device, such as N1 235, and applied to an electronic synapse device, such as the synapse device 10. In block 1220, a second voltage pulse V2 is generated having an opposite polarity sign than the first sign by an electronic neuron device, such as N2 236, and the second voltage pulse V2 is applied to the electronic synaptic device, such as synapse device 10.

Process 1200 proceeds with block 1230 where it is determined by functionality and characteristics of the synapse device 10 whether the first voltage pulse V1 and the second voltage pulse V2 and the delay between them combine to create a setting voltage that is less than a switching voltage magnitude threshold or whether the algebraic sum in voltage between the trailing edge of first voltage pulse V1 and the simultaneous value of the second voltage pulse V2 is the turn-on voltage. If it is determined that the criteria in block 1230 is not met, process 1200 proceeds with block 1250 where the switching state of the electronic synapse device remains the same. If the criteria in block 1230 is met, process 1200 proceeds with block 1240. In block 1240, the electronic synapse device 10 is switched to a binary ON state as a result of applying the particular opposite signed first and second voltage pulses (V1 and V2) to the electronic synapse device 10.

Figure 13:
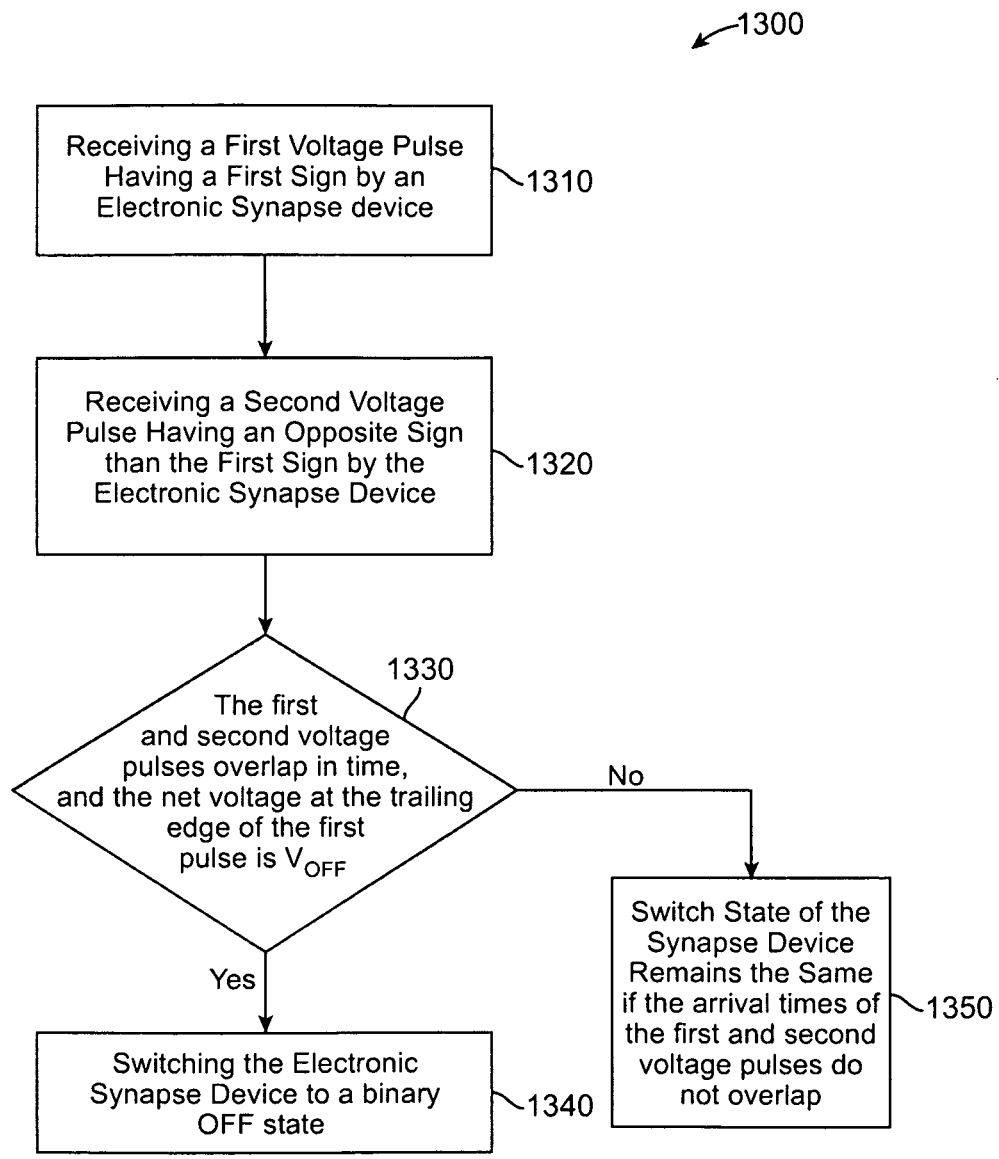
FIG. 13 illustrates a block diagram of a process for switching an electronic synapse to a binary OFF state according to an embodiment of the invention.

FIG. 13 illustrates a block diagram of a process 1300 for switching a synapse device, such as synapse device 10, to a binary OFF state based on a series of controlled/uncontrolled voltage pulses V1 and V2 as illustrated in FIGS. 7A-11. In block 1310, a first voltage pulse V1 is generated by an external electronic neuron device, such as N1 235, and applied to an electronic synapse device, such as the synapse device 10. In block 1320, a second voltage pulse V2 is generated by an external electronic neuron device, such as N2 236, having an opposite polarity sign than the first sign, and the second voltage pulse V2 is applied to the electronic synaptic device, such as synapse device 10. In block 1330, the criterion of whether the leading edge (i.e., V2L) of the second voltage pulse V2 occurs at a time after a trailing edge (i.e., V1T) of the first voltage pulse V1 is determined by duration of the pulses V1 and V2 and by the relative delay between them. Process 1300 continues to block 1350 if the leading edge (i.e., V2L) of the second voltage pulse V2 occurs at a time after a trailing edge (i.e., V1T) of the first voltage pulse V1, or if the trailing edge of pulse V2 (V2T) occurs before the leading edge of pulse V1 (V1L). In block 1350 the switch state of the electronic synapse device remains the same if the arrival times of the first and second voltage pulses (V1, V2) do not overlap.

Conversely, if the pulses overlap and the algebraic sum of the trailing edge of pulse V1 (V1T) and the simultaneous value of the second voltage pulse V2 is the switch-off voltage. The process 1300 proceeds to block 1340. In block 1340, the electronic synapse device is switched to a binary OFF state as a result of the particular delay between the opposite signed first and second voltage pulses (V1 and V2) applied to the electronic synapse device where the leading edge of the second voltage pulse V2 occurs before the trailing edge of the first voltage pulse V1.

In certain embodiments of the invention, a plurality of first voltage pulses V1 and second voltage pulses V2 are applied across a plurality of electronic synapse devices 10 by a plurality of first neurons $N_i$ (as N1 235) and second neurons $N_j$ (as N2 236) in a system of electronic synapse devices 10, such as shown by system 100 in FIG. 1A, where i and j are positive integers. In these embodiments of the invention, the conductance states of the plurality of synapse devices 10 is determined by the sequence of pulses from the plurality of neurons $N_i$ depending on the intended application, such as pattern recognition, linear classification, stimulated motor response, etc.

Figure 14:
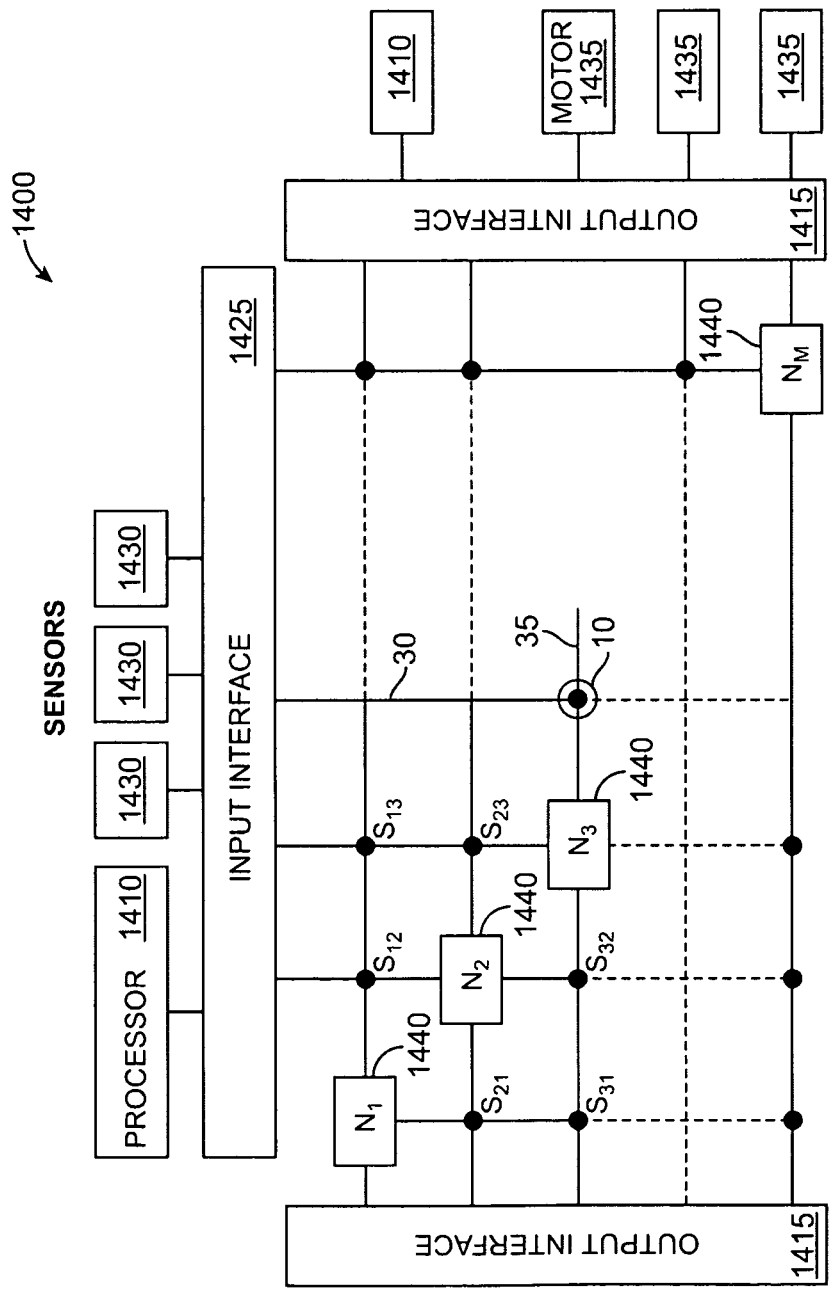
FIG. 14 illustrates a block diagram of a system including a plurality of electronic neurons and electronic synapse devices.

FIG. 14 illustrates an alternative system 1400 with an architecture topologically identical to that of system 100 (see FIG. 1) with neurons 1440 $N_1$ through $N_M$ (M being a positive integer). Further included in system 1400 is a signal input interface 1425, and output interfaces 1415, which may connect to other computing devices, sensor devices, detection devices, etc., (e.g., optical, auditory, etc.), motive actuators 1435, etc. In one embodiment of the invention devices 1430 may input signals to the processor(s) 1410 and read out switch states from system 1400 through the output interfaces 1415. In one embodiment of the invention, signals, such as voltage pulses, current pulses, etc. are generated by the electronic neurons $N_1$-$N_M$ 1440 which set the conductances of synapse devices 10 in system 1400. External signals are provided via the signal input interface 1425, which distributes the generated signals to the system 1400. The pulses from the neurons 1440 in combination with the input signals cause synapse devices 10 in system 1400 to switch to an ON state, switch to an OFF state, or remain at a current state. In one embodiment of the invention, the electronic neurons 1440 $N_1$-$N_M$ input voltage pulses to the system 1400 through the input interface 1425 similarly as voltage pulses are input through electrode arrays 15 and 20 (see FIG. 1B).

In contrast to von Neumann computing, synapses are memory elements that are modified in-place, that is, memory and computation are distributed in the biological brain. Thus, embodiments of the invention propose a synapse-like device that breaks the mold of traditional computing by creating a form of active memory. Similar as in animal brains, in one embodiment of the invention multiple electronic neurons are connected to each other, pair wise, by an electronic synapse. The processing function of the brain is accomplished by neurons firing, that is by applying voltage spikes to all the synapses to which they are connected. Memory is contained in the electrical conductances of all the synapses. To emulate brain function the embodiments of the invention have electronic synapses that exhibit spike-timing dependent plasticity. That is if, in a given neuron pair, the post-synaptic neuron fires soon after the pre-synaptic neuron, the synapse should strengthen the connection by increasing its conductance. Conversely, if the post-synaptic neuron fires before the pre-synaptic neuron, the synapse should weaken the connection by decreasing its conductance. The embodiments of the invention described herein provide such spike-timing dependent plasticity.

As is known to those skilled in the art, the aforementioned example architectures described above, according to the present invention, can be implemented in many ways, such as program instructions for execution by a processor, as software modules, microcode, as computer program product on computer readable media, as logic circuits, as application specific integrated circuits, as firmware, etc. The embodiments of the invention can take the form of an entirely hardware embodiment, an entirely software embodiment or an embodiment containing both hardware and software elements. In a preferred embodiment, the invention is implemented in hardware, wherein the synapses are nanotrap memory elements and the neurons are mixed analog-digital circuits that integrate the inputs from a plurality of synapses and fire according to a threshold criterion.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart illustrated in FIGS. 12 and 13 and block diagrams in FIGS. 1-4, 6 and 14 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, are preferably implemented by special purpose hardware-based systems that perform the specified functions or acts, or combinations of special purpose hardware and computer instructions.

I/O devices (including but not limited to keyboards, displays, pointing devices, etc.) can be connected to the system either directly or through intervening controllers. Network adapters may also be connected to the system to enable the data processing system to become connected to other data processing systems or remote printers or storage devices through intervening private or public networks. Modems, cable modem and Ethernet cards are just a few of the currently available types of network adapters. In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known structures and techniques have not been shown in detail to avoid obscuring the understanding of this description.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An electronic synaptic device, comprising:
   a first electrode;
   a second electrode; and
   a composite medium disposed between, and in contact with, the first and second electrodes, wherein the composite medium comprises a layer of discrete charge trapping particles so that an electrical resistance measured across the first and second electrodes is selectively variable;
   wherein switching the electronic synaptic device to an OFF state or to a multilevel ON state occurs by applying a pre-synaptic voltage pulse and a post-synaptic voltage pulse to the first and second electrodes, respectively, wherein the post-synaptic voltage pulse has an opposite polarity to the pre-synaptic voltage pulse, wherein magnitude of the pre-synaptic voltage pulse and the post-synaptic voltage pulse each are below a switching voltage magnitude threshold, and a difference in magnitude between the pre-synaptic voltage pulse and the post-synaptic voltage pulse exceeds the switching voltage magnitude threshold by an amount, wherein the amount is a function of a relative timing between the pre-synaptic voltage pulse and the post-synaptic voltage pulse, and conductance of the composite medium is controlled by the relative timing between the pre-synaptic voltage pulse and the post-synaptic voltage pulse, and wherein the composite medium material determines whether the pre-synaptic voltage pulse, the post-synaptic voltage pulse and delay between the pre-synaptic voltage pulse and the post-synaptic voltage pulse combine to form a setting voltage less than the switching voltage magnitude threshold.

2. The electronic synaptic device of claim 1, wherein the electronic synaptic device exhibits multiple stable resistance levels when the voltage difference between the pre-synaptic voltage pulse and the post-synaptic voltage pulse are below the switching voltage threshold.

3. The electronic synaptic device of claim 1, wherein conductance state of the electronic synaptic device is based on a net voltage difference between a trailing edge of the pre-synaptic voltage pulse and a simultaneous value of the post-synaptic voltage pulse, wherein the composite medium material determines whether a sum in voltage between the trailing edge of the pre-synaptic voltage pulse and the simultaneous value of the post-synaptic voltage pulse comprises a turn-on voltage of the electronic synaptic device.

4. The electronic synaptic device of claim 1, wherein a current conductance state of the electronic synaptic device remains constant when an arrival time of the pre-synaptic voltage pulse and the post-synaptic voltage pulse do not overlap.

5. The electronic synaptic device of claim 1, wherein the pre-synaptic voltage pulse and the post-synaptic voltage pulse have a substantially square form.

6. The electronic synaptic device of claim 1, wherein the pre-synaptic voltage pulse or the post-synaptic voltage pulse, or both the pre-synaptic voltage pulse and the post-synaptic voltage pulse ramps from a first voltage level to a second voltage level.

7. The electronic synaptic device of claim 1, wherein the pre-synaptic voltage pulse has a square form and the post-synaptic voltage pulse exhibits two maxima levels in absolute magnitude, or the post-synaptic voltage pulse has a square form and the pre-synaptic voltage pulse exhibits two maxima levels in absolute magnitude or where both voltage pulses exhibit two maximum levels in absolute magnitude.

8. The electronic synaptic device of claim 1, further comprising:
   a pre-synaptic electronic neuron device comprising a first pulse generator configured to generate and apply the pre-synaptic voltage pulse to the electronic synaptic device, and
   a post-synaptic electronic neuron device comprising a second pulse generator configured to generate and apply the post-synaptic voltage pulse to the electronic synaptic device.

9. An electronic synaptic system, comprising:
   a first electronic neuron device configured to generate and apply a pre-synaptic voltage pulse having a first sign to an electronic synaptic device;
   a second electronic neuron device configured to generate and apply a post-synaptic voltage pulse having an opposite sign than the first sign to the electronic synaptic device, the electronic synaptic device comprising:
   a first electrode;
   a second electrode; and
   a composite medium disposed between and in contact with the first and second electrodes; wherein the composite medium comprises a layer of discrete charge trapping particles so that an electrical resistance measured across the first and second electrodes is selectively variable;
   wherein switching the electronic synaptic device to an OFF state or to a multilevel ON state occurs by applying the pre-synaptic voltage pulse and the post-synaptic voltage pulse to the first and second electrodes, respectively, wherein the pre-synaptic voltage pulse and the post-synaptic voltage pulse each have a magnitude below a switching voltage magnitude threshold, and a magnitude difference between the pre-synaptic voltage pulse and the post-synaptic voltage pulse exceeds the switching voltage magnitude threshold by an amount, wherein the amount is a function of a relative timing between the pre-synaptic voltage pulse and the post-synaptic voltage pulse, and conductance of the electronic synaptic device is controlled by the relative timing between the pre-synaptic voltage pulse and the post-synaptic voltage pulse, wherein the composite medium material determines whether the pre-synaptic voltage pulse, the post-synaptic voltage pulse and delay between the pre-synaptic voltage pulse and the post-synaptic voltage pulse combine to form a setting voltage less than the switching voltage magnitude threshold.

10. The electronic synaptic system of claim 9, wherein the electronic synaptic device exhibits multiple stable resistance levels when the voltage magnitude difference from the pre-synaptic voltage pulse and the post-synaptic voltage pulse are below the switching voltage magnitude threshold.

11. The electronic synaptic system of claim 9, wherein a conductance state of the electronic synaptic device is based on a voltage level at a trailing edge of the pre-synaptic voltage pulse, wherein the composite medium material determines whether a sum in voltage between the trailing edge of the pre-synaptic voltage pulse and the simultaneous value of the post-synaptic voltage pulse comprises a turn-on voltage of the electronic synaptic device.

12. The electronic synaptic system of claim 9, wherein a current conductance state of the electronic synaptic device remains constant when an arrival time of the pre-synaptic voltage pulse and the post-synaptic voltage pulse do not overlap.

13. The electronic synaptic system of claim 9, wherein the pre-synaptic voltage pulse and the post-synaptic voltage pulse have a substantially square form.

14. The electronic synaptic system of claim 9, wherein the pre-synaptic voltage pulse and the post-synaptic voltage pulse, or both the pre-synaptic voltage pulse and the post-synaptic voltage pulse ramps from a first voltage level to a second voltage level.

15. The electronic synaptic system of claim 9, wherein the pre-synaptic voltage pulse has a square form and the post-synaptic voltage pulse exhibits two maxima levels in absolute magnitude, or the post-synaptic voltage pulse has a square form and the pre-synaptic voltage pulse exhibits two maxima levels in absolute magnitude or where both voltage pulses exhibit two maximum levels in absolute magnitude.

16. A method comprising:
receiving a pre-synaptic voltage pulse having a first sign by an electronic synaptic device including a composite medium;
receiving a post-synaptic voltage pulse having an opposite sign than the first sign by the electronic synaptic device; and
switching the electronic synaptic device to an OFF state or to a multilevel ON state by applying the pre-synaptic voltage pulse and the post-synaptic voltage pulse the electronic synaptic device where the pre-synaptic voltage pulse and the post-synaptic voltage pulse each have a magnitude below a switching voltage magnitude threshold, and a difference between the pre-synaptic voltage pulse and the post-synaptic voltage pulse exceeds the switching magnitude voltage threshold by an amount, wherein the amount is a function of a relative timing between the pre-synaptic voltage pulse and the post-synaptic voltage pulse, and conductance of the electronic synaptic device is controlled by the relative timing between the pre-synaptic voltage pulse and the post-synaptic voltage pulse, wherein the composite medium material determines whether the pre-synaptic voltage pulse, the post-synaptic voltage pulse and delay between the pre-synaptic voltage pulse and the post-synaptic voltage pulse combine to form a setting voltage less than the switching voltage magnitude threshold.

17. The method of claim 16, further comprising:
maintaining a current conductance state of the electronic synaptic device when an arrival time of the pre-synaptic voltage pulse and the post-synaptic voltage pulse do not overlap.

18. A method comprising:
receiving a plurality of pre-synaptic voltage pulses each having a first sign by a plurality of electronic synaptic devices;
receiving a plurality of post-synaptic voltage pulses each having an opposite sign than the first sign by the plurality of electronic synaptic devices; and
controlling OFF states or multilevel ON states of the plurality of electronic synaptic devices by applying the plurality of pre-synaptic voltage pulses and the plurality of post-synaptic voltage pulses at the plurality of electronic synaptic devices where a magnitude of each of the plurality of pre-synaptic voltage pulses and a magnitude of each of the plurality of post-synaptic voltage pulses are below a switching magnitude voltage threshold, and a magnitude difference between the plurality of pre-synaptic voltage pulses and the plurality of post-synaptic voltage pulses exceeds the switching voltage magnitude threshold by an amount, wherein the amount is a function of a relative timing between the plurality of pre-synaptic voltage pulses and the plurality of post-synaptic voltage pulses, and conductance of each electronic synaptic device is controlled by the relative timing between an associated pre-synaptic voltage pulse and post-synaptic voltage pulse, wherein function and characteristics of each electronic synaptic device determines whether the pre-synaptic voltage pulses, the post-synaptic voltage pulses and delay between the pre-synaptic voltage pulses and the post-synaptic voltage pulses combine to form setting voltages less than the switching voltage magnitude threshold.

19. The method of claim 18, further comprising:
maintaining a current conductance state of the plurality of electronic synaptic devices when an arrival time of the plurality of pre-synaptic voltage pulses and the plurality of post-synaptic voltage pulses do not overlap.

20. An electronic synapse device, comprising:
a metastable switching synaptic device,
wherein changing conductance of the metastable switching synaptic device occurs by receiving a pre-synaptic voltage pulse and a post-synaptic voltage pulse at the metastable switching synaptic device, wherein the post-synaptic voltage pulse has an opposite polarity to the pre-synaptic voltage pulse, wherein magnitude of the pre-synaptic voltage pulse and the post-synaptic voltage pulse each are below a switching voltage magnitude threshold, and a magnitude difference between the pre-synaptic voltage pulse and the post-synaptic voltage pulse exceeds the switching voltage magnitude threshold by an amount, wherein the amount is a function of a relative timing between the pre-synaptic voltage pulse and the post-synaptic voltage pulse, and the conductance of the metastable switching device is controlled by the relative timing between the pre-synaptic voltage pulse and the post-synaptic voltage pulse, wherein characteristics of the metastable switching synaptic device determines whether the pre-synaptic voltage pulse, the post-synaptic voltage pulse and delay between the pre-synaptic voltage pulse and the post-synaptic voltage pulse combine to form a setting voltage less than the switching voltage magnitude threshold.

21. The electronic synapse device of claim 20, wherein a resulting conductance is determined by a trailing edge of the pre-synaptic voltage pulse and simultaneous magnitude of the post-synaptic voltage pulse.

* * * * *